US006337480B1

(12) United States Patent
Andrien, Jr. et al.

(10) Patent No.: US 6,337,480 B1
(45) **Date of Patent: *Jan. 8, 2002**

(54) DISPOSABLE MICROTIP PROBE FOR LOW FLOW ELECTROSPRAY

(75) Inventors: Bruce A. Andrien, Jr.; Craig M. Whitehouse, both of Branford; Michael A. Sansone, Hamden; Denise M. Sauro, Branford; Glenn P. Whitehouse, Wallingford, all of CT (US)

(73) Assignee: Analytica of Branford, Inc., Branford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/632,572

(22) Filed: Aug. 4, 2000

Related U.S. Application Data

(63) Continuation of application No. 09/041,715, filed on Mar. 13, 1998, now Pat. No. 6,127,680.

(60) Provisional application No. 60/040,599, filed on Mar. 15, 1997.

(51) Int. Cl.[7] .......................... H01J 49/04; G01N 27/26

(52) U.S. Cl. ....................................... 250/288; 250/281

(58) Field of Search .................................. 250/288, 281

(56) References Cited

U.S. PATENT DOCUMENTS 5,306,412 A * 4/1994 Whitehouse et al. ... 204/299 R
5,788,166 A * 8/1998 Valaskovic et al. ......... 239/708
6,127,680 A * 10/2000 Andrien, Jr. et al. ....... 250/288

* cited by examiner

*Primary Examiner*—Bruce Anderson
*Assistant Examiner*—Nikita Wells
(74) *Attorney, Agent, or Firm*—Levisohn, Lerner, Berger & Langsam

(57) ABSTRACT

An Electrospray probe which includes a replaceable or disposable micron size diameter Electrospray tip used for low flow rate Electrospray has been developed. The Electrospray probe assembly combines the use of a low pressure gas and electric fields to initiate and sustain the Electrospray process at low liquid flow rates. The operational flow rates of this probe range from below 25 nL/min to over 1 $\mu$L/min, with total sample volume loaded ranging from less than 1 $\mu$L to over 20 $\mu$L. The Electrospray probe assembly includes axial and radial adjustment of the Electrospray tip position relative to the sampling orifice into vacuum and that tip position can be locked in place. The replaceable microtip can be safely removed from the Electrospray (ES) chamber without turning off high voltage within the ES chamber. Telescoping support ways have been included to prevent ES tip damage by guiding the Electrospray probe tip during removal from and insertion into the ES chamber. The replaceable microtip is held in a fixed position during operation with a collet assembly which also provides electrical contact with coated microtips. The replaceable microtip ES probe assembly is compatible with microtips that are metal or coated or uncoated glass materials. For uncoated glass microtips the ES probe assembly accommodates a wire electrical contact which is installed in the replaceable microtip bore.

56 Claims, 5 Drawing Sheets

DISPOSABLE MICROTIP PROBE FOR LOW FLOW ELECTROSPRAY

RELATED APPLICATIONS

This application is a continuation of U.S. patent application Ser. No. 09/041,715 filed Mar. 13, 1998, now U.S. Pat. No. 6,127,680 which claims the priority of U.S. Provisional Application Ser. No. 60/040,599 filed Mar. 15, 1997. The present application claims all priority rights to those prior applications, whose disclosures are hereby fully incorporated herein by reference.

BACKGROUND

Wilm and Mann[1-3] demonstrated the use of metal coated glass Electrospray (ES) tips with micron size orifices to study proteins and peptides. They Electrosprayed sample using small diameter tips and demonstrated that low nanoliter per minute liquid flow rates were possible with total sample consumption of less then one microliter. Less than one microliter of sample bearing liquid can be loaded into a glass tube with a sharply drawn exit end tip (microtip). The Electrospray flow rates with these tips can typically be 25 nanoliters per minute allowing analytical ES mass spectroscopy run times exceeding thirty minutes for one microliter of sample solution loaded. Extensive mass analysis including Collisional Induced Dissociation (CID) and MS/MS studies can be performed automatically or manually in this time frame with minimum sample consumption.

A glass replaceable Electrospray microtip can be fabricated by drawing a small glass tube out to a point which may have an inner diameter on the order of one to a few microns in diameter and a wall thickness at the tip of less than ten microns. This smaller inner diameter and small ES tip outer diameter results in a Taylor cone with and a reduced base diameter. The lower liquid flow rates result in a smaller filament diameter extending from the Taylor cone when compared to the filament diameters formed from higher flow rate Electrospray applications where larger bore ES tips are used. In Electrospray operation, charged droplets are formed by breaking off the liquid filament protruding from the tip of the stable Taylor cone. The Electrosprayed charged droplets produced from microtips are smaller in diameter than one micron and are not generally visible with forward light scattering and magnification as is the case with higher flow rate Electrospray operation. The lower liquid flow rates and smaller charged droplet sizes produced from Electrospray with microtips allow higher sampling efficiency and improved sensitivity when compared with higher flow rate Electrospray. Sensitivity is defined here as signal to noise achieved versus sample consumed. The reduced diameter of the ES microtips also allows the unassisted Electrospraying of aqueous solutions or aqueous solution containing acids or buffers. Electrospraying of such solutions is required for example when mass analyzing proteins in an active or native folding pattern. The increased sensitivity, longer working time and greatly reduced consumption of sample has led to increasing use of ES/MS operation with reduced diameter Electrospray tips, referred to herein as microtips.

Replaceable microtips have been fabricated with metal tubes, fused silica tubes and borosilcate tubes. Borosilcate tubes pulled down to a fine tip and gold coated on the tip outer surface have become the most common type of microtip used in the field. This combination is primarily due to the ease and low cost of uniformly fabricating such tips from standard glass tube sizes. Depending on the tip drawing and metal coating process used, microtips tips have been fabricated with closed and open ends and with widely varying quality in metal coating operational longevity. In practice, conductive paste is often used to insure electrical contact between the metal coated tip and the microtip holder. This is undesirable due to increased setup time and due to the addition of a contaminating substance which can produce unwanted mass spectral background peaks during Electrospray operation. In most commercially available Electrospray sources which include microtips, the microtips must be operated at hundreds or thousands of volts to achieve stable Electrospray. High voltage applied directly to the microtip instead of ground potential has made some Electrospray configurations less safe during operation due to exposed high voltage in some designs. In previous Electrospray source designs, high voltage applied to the microtip must be turned off to insure user safety when microtips are exchanged. Changing the ES source conditions or partially disassembling or opening the ES source to exchange microtips can be inconvenient and inefficient when trying to maximize sample throughput.

The invention includes a new Electrospray probe with removable microtips apparatus with improved methods of microtip setup and installation. The ES probe design facilitates the removal and installation of microtips. The design allows for automatic and reliable electrical contact at the Electrospray tip for metal coated or uncoated microtips without the need for conductive paste or other contaminants added to the tip. The ES probe accepts a range of microtip sizes and types. Axial and radial adjustment is included in the ES probe to allow optimal positioning of the microtip with the orifice into vacuum in the ES atmospheric pressure chamber. The invention includes a means of forming an electrical contact with the ES probe when using fused silica or borosilcate microtips having no conductive coating. For such microtips, one embodiment of the invention includes a conducting wire placed along the inside bore of the microtip which is held in place with an external O-ring. The O-ring is positioned in a maimer which insures electrical contact between the wire and the ES probe when the microtip is installed. Microtips which are fabricated with and open tip orifice can be used without modification in the ES microprobe apparatus. Dipping such an open tipped microtip into a solution, particularly solutions with low surface tension, prior to loading the sample will aid in bringing the sample to the tip when initiating Electrospray. This method is particularly useful when Electrospraying high surface tension aqueous solutions through very small bore microtips. The inventions improve the reliability of Electrospray operation with microtips and increase the operational longevity of each microtip. A large range of coated and uncoated tip styles can be installed in the new Electrospray probe apparatus. The probe assembly includes the option of applying gas flow locally at the tip during ES operation. Such an option may be used to suppress corona discharge while Electrospraying aqueous solutions or running in negative ion mode. The new apparatus combined with improved microtip setup methods increases the ease of use and reduces the cost of running samples with microtip low flow rate Electrospray. One embodiment of the invention allows the safe and convenient exchange of microtips without the need to turn off the high voltage potentials in the Electrospray atmospheric pressure source chamber even if voltage other than ground potential is applied directly to the microtip itself during operation. This embodiment eliminates the cost and complexity of including safety voltage shutoffs for the Electrospray chamber and enables the user to rapidly and efficiently exchange Electrospray microtips with a minimum of down time.

SUMMARY OF THE INVENTION

One aspect of the invention comprises an Electrospray probe assembly which includes a removable microtip. A preferred embodiment of the invention includes a collet assembly which clamps around the microtip to hold the microtip in position and provide electrical contact to electrically conductive or metal coated microtips. The collet assembly enables convenient microtip insertion into and removal from the Electrospray probe assembly. The collet assembly is part of a separable microtip holder assembly which includes a removable O-ring gas seal. The gas seal, when installed, allows static gas pressure to be applied to the removable microprobe internal bore to aid in Electrospray operation. When the gas seal is removed, gas can flow through the collet fingers and surround the microtip during operation. Gas such as oxygen can be applied to the microtip during operation to suppress corona discharge. Even through gas is flowing through the collet fingers, gas pressure can still be applied to the microtip se due to the small slot size between the collet fingers or due to a fixed leak rate set by the gas seal. The collet holds the removable microtip in place with or without the gas pressure seal installed. The separable microtip holder assembly including a collet and removable microtip can be conveniently and rapidly exchanged by detaching the removable microtip holder assembly from the ES probe extension tube.

Another aspect of the invention is the inclusion of a retractable assembly affixed to an ES probe tip location adjuster. The retractable assembly, which includes telescoping ways, allows the safe removal of the separable microtip holder assembly including a microtip from the ES chamber without opening the ES chamber. Exchange of the microtip holder assembly including a microtip can take place outside the ES chamber. Any voltages applied to the microtip during operation automatically disconnect as the ES probe is slid out of ES chamber insuring user safety and convenience. When the ES probe is reinserted, the electrical connection is made automatically without the need to turn the ES chamber voltages on or off Retractable ways insure that the fragile microtip does not contact any surfaces on the way in or out of the ES chamber. The ways also serve as a guide to facilitate insertion and removal of the microtip into and out of the ES chamber.

Another aspect of the invention is the combination of the retractable ES probe assembly with removable microtip and the inclusion of tip position adjusters within the ES probe assembly. The ES microtip probe assembly mounts to an Electrospray chamber which may include at least one viewport. The viewport allows the visual checking of the microtip position and condition during Electrospray operation.

Another aspect of the invention includes microtips which are used in combination with an internal electrical contact wire said wire being configured and held in position by a means which is external to the microtip bore. The wire serves as an electrical contact between the microtip holder assembly and to the liquid sample loaded into the microtip. Through this technique, voltage is applied to the microtip during Electrospray operation.

In addition, the invention further includes a method of breaking and opening the closed end of closed ended microtips outside the ES chamber prior to introducing the sample into the microtip. The microtip drawn end is broken against a container surface while pressurizing the microtip internally and while immersing said tip in a liquid.

The invention also includes a method for qualifying the opening size of the microtips by immersing the exit end of said microtips in a liquid and detecting the emitted stream of air bubbles to determine size of the microtip opening.

Another aspect of the invention includes the method of wetting the internal bore of the microtip exit end prior to loading a sample bearing liquid to facilitate the initiation of Electrospray.

BRIEF DESCRIPTION OF THE FIGURES

FIG. 1(*b*) is an enlarge view of a portion of FIG. 1(*a*).

DETAILED DESCRIPTION OF INVENTION

Electrospray Probe Assembly

Figures 1A, 1B:
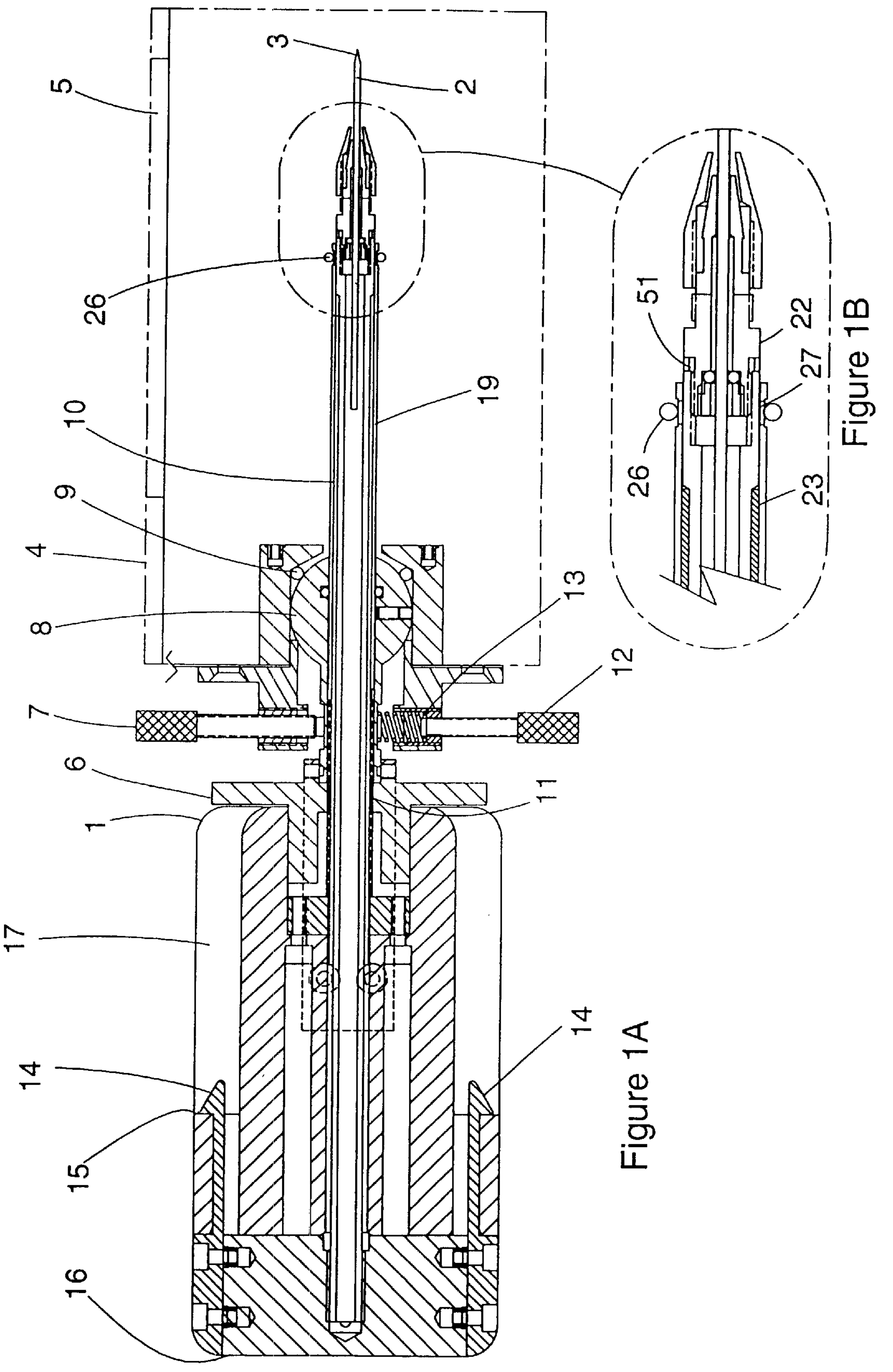
FIG. 1(*a*) illustrates a preferred embodiment of an Electrospray probe which includes a removable microtip shown in the closed and operational position.
Figure 2:
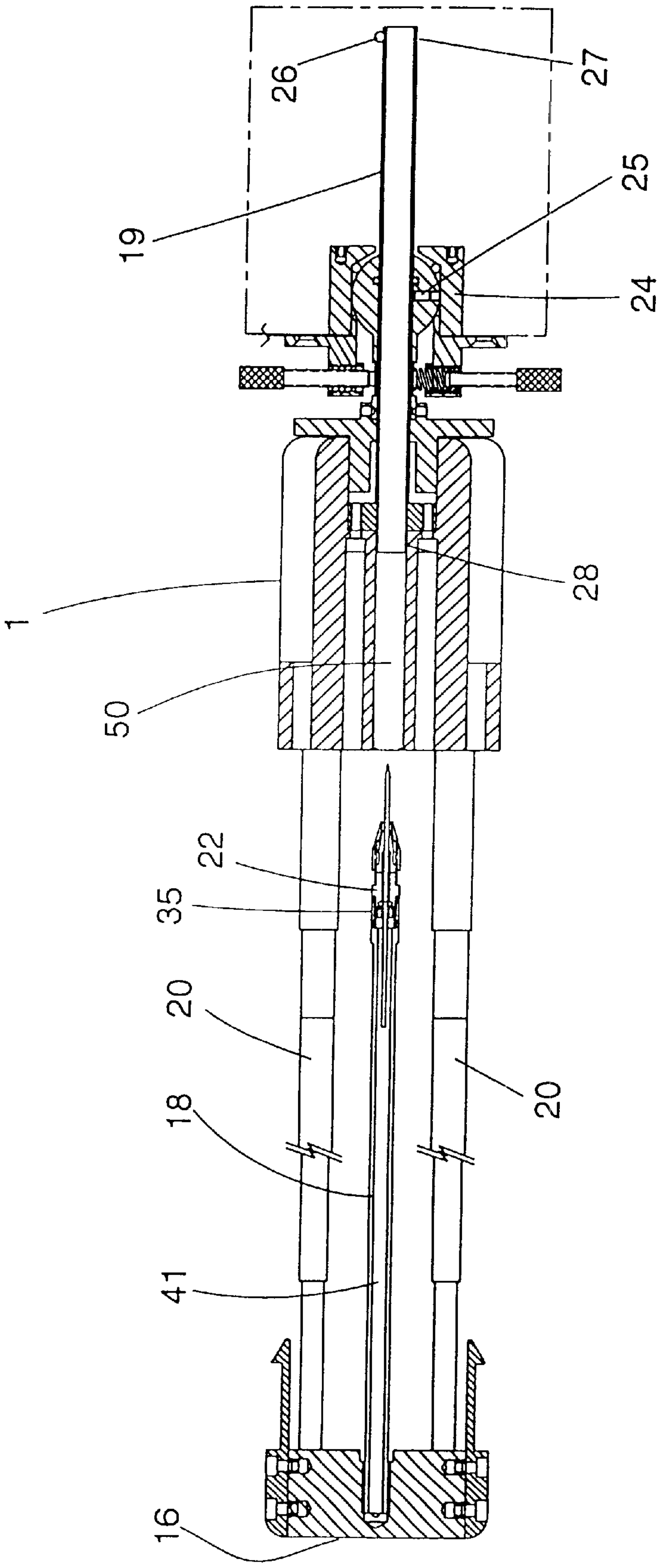
FIG. 2 shows a preferred embodiment of an Electrospray probe which includes a removable microtip shown in the open position.

An Electrospray probe apparatus which includes a removable microtip is shown in FIGS. 1 and 2. FIG. 1 shows an Electrospray probe assembly 1 which includes a removable microtip 2. The ES probe assembly 1 is shown mounted to an Electrospray atmospheric pressure chamber 4 in its closed or operational position. The Electrospray chamber contains at least one window or viewport 5 to aid the user in visually aligning the microtip with the orifice into vacuum and for checking the status of the Electrospray during operation. Axial and radial adjustment of microtip 2 position relative to the orifice into vacuum is achieved by using adjusters 6 and 7. When axial position adjuster 6 is turned, threaded portion 11 moves the ES probe assembly 1 with probe body 17 and tube assembly 10 in or out along the axis of tube assembly 10. The radial position of microtip 2 is set by turning treaded adjuster 7 which causes rotation of ES probe assembly 1 around the center of ball shaped guide 8. Ball guide 8 rotates on seal 9. Seal 9 maintains a gas seal for all rotational positions of ES probe 1. Another radial position adjuster is located at ninety degrees to adjuster 7 (out of the plane of view) so that a full range of radial position adjustment of ES probe 1 can be achieved. Radial adjuster 7 is opposed by a spring 13 during adjustment of ES probe 1 in the radial position. Once an optimal radial position is found by turning position adjuster 7 and its orthogonal matching adjuster, the position is locked in place by tightening locking screw 12 and its orthogonal matching locking screw. Once ES probe assembly 1 is positioned, microtips 2 can be removed and reinserted into ES chamber 4 with microtip exit end 3 automatically falling in the same position with each insertion. Consequently, there is no need for readjustment of the microtip exit end 3 position when sample is reloaded enabling rapid, reproducible and convenient sample loading and mass spectrometric (MS) data collection.

The exchange of microtip 2 when reloading a sample is achieved by first releasing ES probe locks 14 by squeezing them inward until they clear catch 15. The release of locks 14 frees rear probe plate assembly 16 to slide away from ES probe body 17. Referring to FIG. 1 and FIG. 2, tube assembly 18 is attached to rear probe plate assembly 16 and tube assembly 18 slides out of guide tube assembly 19 when rear plate assembly 16 is pulled back. Rear plate assembly 16 is attached to retractable ways 20 which guide the movement of tube assembly 18 and the attached removable tip holder assembly 22. Retractable ways 20 prevent microtip 3 from contacting any surface when microtip 2 is inserted or removed from ES source chamber 4. Microtips 2 are reusable so ES probe assembly 1 is designed to avoid damage to microtip 2 even for repeated cycles of installation or removal of microtips 2 from ES source chamber 4. Insulating layer 23 is added to tube assembly 18 to prevent the user from being exposed to high voltage as rear plate assembly 16 is slide away from ES probe assembly 1. For ES probe assembly 1 shown in FIGS. 1 and 2, microtip 2 can be operated at either ground or high voltage. When tube assembly 18, removable tip holder 22 and microtip 2 are set at ground potential, then adjuster mount 24 and ball 8 can be fabricated from a conductive material and all conductive parts including guide tube 19 are maintained at ground potential through spring contact 25. When microtip 2 is operated at high potential, adjuster parts 24, 8, 6, ES probe body 17, rear plate assembly 16 and even tube 18 are fabricated from insulating material. For high voltage operation, electrical contact to microtip 2 is made though spring *act 26 mounted on guide tube 19. spring contact 26 protrudes through grooves 27 cut through guide tube 19. When removable tip holder assembly 22 is fully inserted through guide tube 19 as shown in FIG. 1, the electrical connection is made due to through contact with spring contact 26. When removable tip holder assembly 22 is slid out of ES source chamber 4 through guide tube 19, the electrical connection is broken between guide tube 19 and removable tip holder assembly 22. When removable tip holder 22 clears exit end 28 of guide tube 19, tip holder 22 no longer has high voltage applied even if high voltage remains on guide tube 19. Insulator 23 prevents exposing the user to high voltage as microtip 2 is removed from ES chamber 4.

Figure 3:
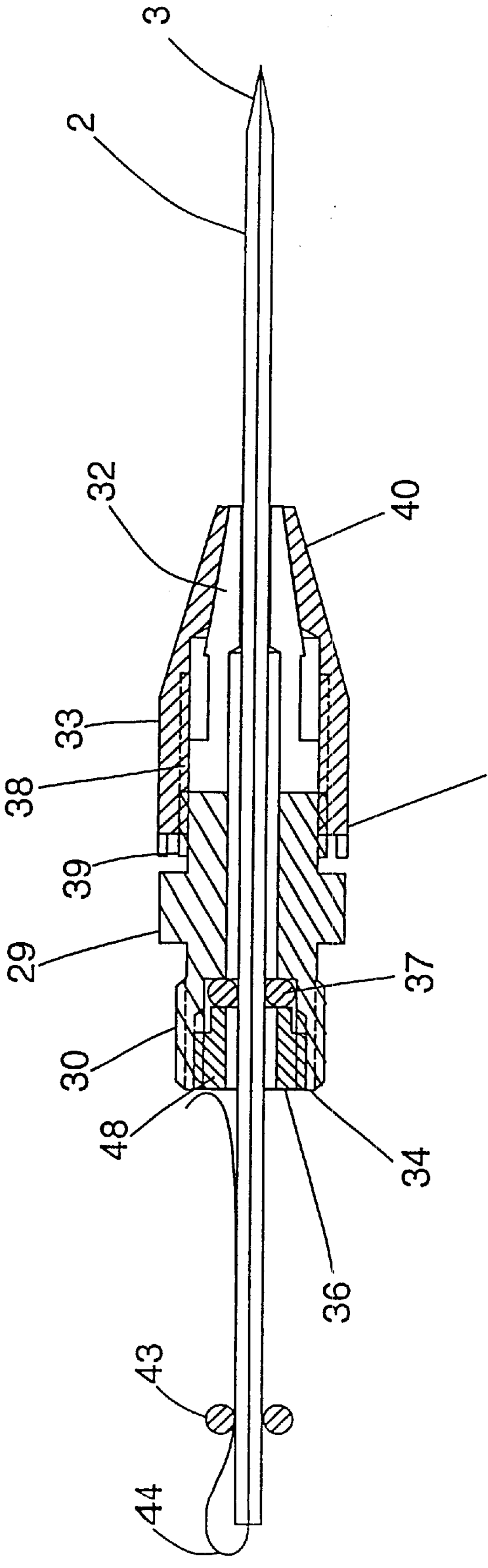
FIG. 3 illustrates a preferred embodiment of the removable tip holder assembly which has been separated from the ES probe assembly. The tip holder assembly is shown with the collet assembly closed.
Figure 4:
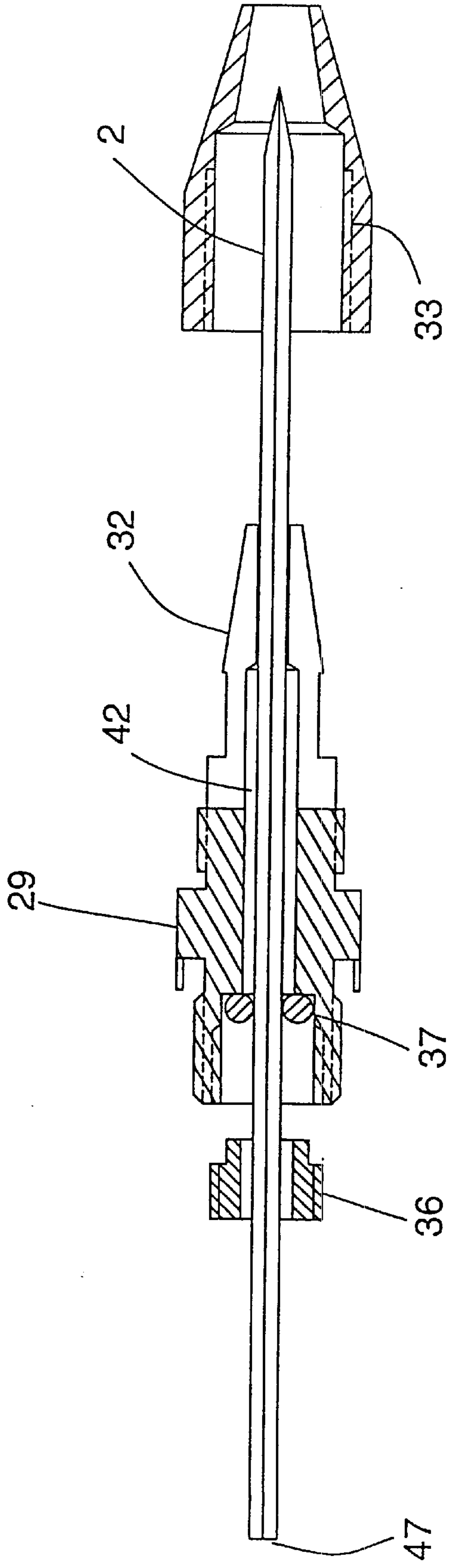
FIG. 4 illustrates a preferred embodiment of the removable tip holder assembly which has been separated from the ES probe assembly. The tip holder assembly is shown with the collet assembly open.

When rear plate assembly 16 has been pulled back such that retractable ways 20 are fully extended, microtip 2 will be clear of ES probe body 17. Removable tip holder assembly 22 can then be detached from tube assembly 18 and a reloaded tip holder assembly can be reattached to tube assembly 18 for reinsertion into ES chamber 4. Details of removable tip holder assembly 22 are shown in FIGS. 3 and 4. FIG. 3 shows removable tip assembly 22 with collet 32 clamped on microtip 2 by tapered nut 33. In one embodiment of tip holder 22, body 29 comprises an external threaded portion 30 configured at end 34 which allows attachment of tip holder assembly 22 to tube 18. External threaded portion 30 screws into a matched internal threaded portion in tube 18. Removable tip holder assembly 22 is then detached from tube 18 by unthreading assembly 22 from end 35 of tube 18. Microtip 2 is held in tip holder assembly 22 by collet fingers 32. The collet with fingers 32 may be detachable or integral to tip holder body 29. Tapered nut 33 is tightened on collet fingers 32 by engaging internal threaded portions 38 on tapered nut 33 with external threaded portions 39 on tip holder body 29. When microtip 2 is coated with a conductive material, clamping of collet fingers 32 on microtip 2 also makes electrical contact with microtip 2 exit end 3 and tip holder assembly 22. Microtip 2 can be removed from tip holder assembly 22 by loosening tapered nut 33 on collet fingers 32 and sliding microtip 2 out end 40 of tip holder assembly 22. O-ring seal 37, which is held in place by nut 36, provides a gas seal so that back pressure can be applied through bore 41 of tube 18 during operation. Nut 36 can be tightened to increase the force exerted by seal 37 on the outer diameter of microtip 2. Seal 37 can also be removed or loosened to provide a set leakage along the outer diameter of microtip 2 at a given back pressure. In this manner gas introduced through tube 18 inner bore 41 can flow through annulus 42, and on through the gaps between collet fingers 32. The gas flowing through the gaps between collet fingers 32 surrounds microtip 2 exit end 3 during operation. Gas such as oxygen can be added in this manner to prevent the onset of corona discharge at microtip exit end 3 during operation. Seal 37 can be replaced by a collar which gives a desired flow rate at a given pressure for more precise control of gas flow rate to microtip exit end 3 during operation.

Microtip 2 coated with a conductive material forms an electrical contact with tip holder assembly 22 when collet fingers 32 clamp on the conductive coating. A conductive coating extends from microtip 2 exit end 3 along the outer surface of microtip 2 and continues under collet fingers 32. A microtip 2 is loaded into replaceable microtip holder 22 by inserting the entrance or loading end 47 into the open collet fingers 32. When microtip 2 has been inserted into tip holder assembly 22 to the desired position, tapered nut 33 is tightened on tip holder body 29 closing collet fingers 32 onto microtip 2. Inserting microtip 2 into open collet fingers 32 prevents scraping off of the coated conducting surface which could lead to an intermittent contact during Electrospray operation. Collet fingers clamp radially in on any conducting surface of a microtip 2 without scraping the conducting surface thus insuring a reliable electrical contact between microtip 2 and tip holder 22. This electrical contact is made without the need to add conductive paste or conductive paint as is the case with other Electrospray probe apparatus currently being used to hold microtips during Electrospray ionization. Clamped collet 32 holds microtip 2 in place independent of seal 37. Thus seal 37 can be set up to seal or pass a set gas flow rate without effecting the held position of microtip 2 or the electrical contact to microtip 2.

ES probe 1 apparatus is configured to allow simple and convenient exchange of microtip 2 when loading a new sample for analysis. As shown in FIG. 2, when the retractable ways are fully extended, removable tip holder 22 can be detached from tube 18 microtip by unscrewing along threaded portion 30. Microtip 2 is loaded with sample and inserted and clamped into removable tip holder 22 before reattaching tip holder 22 to tube 18. Alternatively, the sample can be loaded into tip 2 when tip 2 is clamped in tip holder assembly 22. Ring seal 51 is sandwiched between tip holder 22 and end 35 of tube 18 when tip holder assembly 22 is threaded into tube 18. Ring seal 51 prevents gas which has been introduced under pressure into bore 41 from leaking out through the joint between tube 18 and tip holder assembly 22. Gas pressure is introduced through a gas line connector fitting mounted in ES probe body 17. Gas enters end plate assembly 16 through a channel with a seal when end plate assembly 16 is locked to ES probe body 17 in the closed position. With the gas connection to microprobe 2 inlet configured in this manner, the gas line and line connection does not move as ES probe assembly 1 is opened and closed. Gas pressure applied to the bore of microtip 2 aids in initiating and maintaining stable Electrospray operation from small diameter tips.

When tip holder assembly 22 is reinstalled on tube 18, probe endplate assembly 16 is moved back toward ES probe body 17. As probe endplate assembly 16 with tube 18 and tip holder 22 is moved forward, microtip 2 enters bore 50. Retractable ways 20 guide the movement of microtip 2 to prevent microtip 2 from touching the wall of bore 50 as the exit end 3 of microtip 2 enters bore 50. Once tip holder assembly 22 enters bore 50, both ways 20 and tip holder 22 act as a guide for microtip 2 as it is reinserted into ES chamber 4 through guide tube 19. Probe end plate 16 assembly is moved toward ES probe body 17 until locks 14 engage locking surfaces 15 and the gas pressure inlet seal is reestablished between ES probe body 17 and probe endplate assembly 16. The configuration of ES probe assembly 1 enables the removal and reinsertion of microtips without the need to open ES chamber 4. By eliminating the need to open the ES chamber between microtip exchanges, the ES chamber temperature, drying gas flow rate and voltage can remain optimized. This minimizes downtime and variation in performance when exchanging samples.

A microscope can be mounted to the ES source and positioned to view exit end 3 of microtip 2 during setup and Electrospray operation. The microscope aids in aligning exit end 3 of microtip 2 with the orifice into vacuum, aids in viewing the condition of exit end 3 of microtip 2 and allows a visual check of the sample liquid level remaining in microtip 3 during operation. If the signal diminishes, a visual check to see if sample bearing liquid remains in microtip 2 rapidly determines whether the signal has dropped due to a plugged exit end 3 or due to depletion of sample.

ES probe assembly 1 can be interfaced to commercially available Electrospray sources to achieve low flow rate Electrospray operation with replaceable Electrospray tips. ES probe assembly 1 is compatible with multiple MS platforms including quadrupoles, ion traps, magnetic sector, Fourier Transform Mass Spectrometers (FTMS), and Time-Of-Flight mass analyzers. The exchange of apparatus between higher flow rate ES probes and ES probe assembly 1 can be achieved in just a few minutes.

Replaceable Electrospray tips with small exit end diameters have been fabricated from metal, fused silica[4,5] and borosilcate glass tubes[2,3]. Metal coatings have been added to fused silica and glass tubes to create externally conductive Electrospray tips. Fused silica and glass tubes are drawn down to a fine tip often with the inner bore closed in the drawing process. With current reported methods, samples are loaded into microtips where the exit end tip 3 has been drawn down to a closed point. The tip exit ends 3 are then broken after mounting the microtip tubes in the ES source before turning on the ES voltage. This method of breaking closed tips can lead to vallable tip inner diameter sizes and sometimes lead to loss of sample when the back pressure is applied if the resulting end hole is too large.

Figure 5:
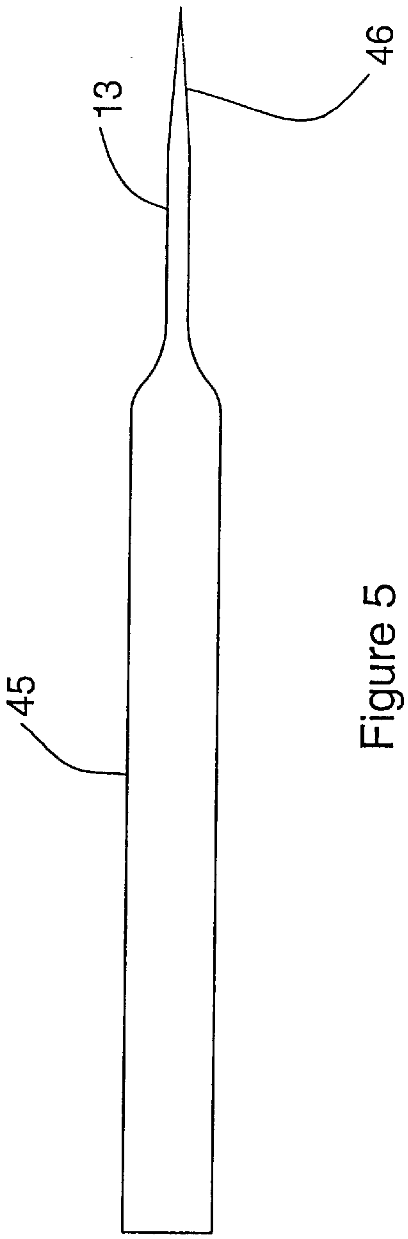
FIG. 5 shows one embodiment of a microtip with no electrical contact wire inserted.

If tips are used which have been drawn down to a closed exit end, an improved method for breaking and qualifying tip opening size has been developed which prevents loss of sample. With this improved method, the microtips are broken prior to loading the sample into the tip bore. The improved method includes the steps of mounting a microtip tube loading or entrance end first into a holder with a gas seal made on the microtip tube outer diameter. The internal bore of the closed drawn exit end microtip is then pressurized with a gas such as nitrogen. The closed drawn end of the microtip which is protruding from the holder is immersed in a liquid such as methanol and touched against the container bottom. Referring to FIG. 5, when closed drawn tip 46 is touched against a surface, a portion of tip 13 breaks creating an opening along drawn tip 13 from which sample liquid can be Electrosprayed. When the tip 46 breaks while immersed in a liquid with a back pressure applied to the bore of microtip 45, bubbles are produced for a given back pressure from the broken tip 13 which can be observed. The size and rate of the bubbles produced, for a given back pressure, gives an indication of the tip opening size. A smaller opening size is preferred because it will deliver a lower flow rate during Electrospray operation and thus provide a longer analysis time for a given amount of sample. Using the bubble checking technique, the size and quality of a broken tip can be assessed before a sample is loaded into the microtip tube. Varying the back pressure and noting the pressure at which the onset of bubble formation occurs for a given solution, allows a refined assessment of the microtip opening size.

It has been found that, on occasion, the Electrospray process can not be initiated with some tips loaded with sample. This is because the liquid surface tension does not allow the sample to move into and through the small tip opening even when back pressure is applied. This effect may lead the user to conclude that the microtip is plugged when it is not. If the user attempts to rebreak the tip with sample loaded, the sample may be lost or the tip opening may end up too large. A tip opening that is to large results in a shorter run time due to increased ES sample flow rate. A method has been developed whereby microtip openings are prewetted before loading the sample into entrance end 47 of microtip 2. Prewetting can be achieved by dipping the microtip drawn and open end 3 into a liquid, preferably a liquid of low surface tension which will be drawn into the microtip opening due to capillary action. The success rate of initiating Electrospray improves when the tips are prewetted prior to loading the sample into the microtip. It is believed that the solvent which wicks up in the small diameter tip opening comes in contact with the loaded sample bearing liquid and effectively breaks the surface tension barrier. Another technique used to start the Electrospray process is to increase the Electrospray tip to counter electrode voltage substantially to initiate the Electrospray process and than immediately, decreasing the voltage after achieving the onset of Electrospray. Applying a low gas pressure to the backside of the sample bearing liquid can also aid in moving the liquid through the microtip exit end 3 opening.

Figure 6:
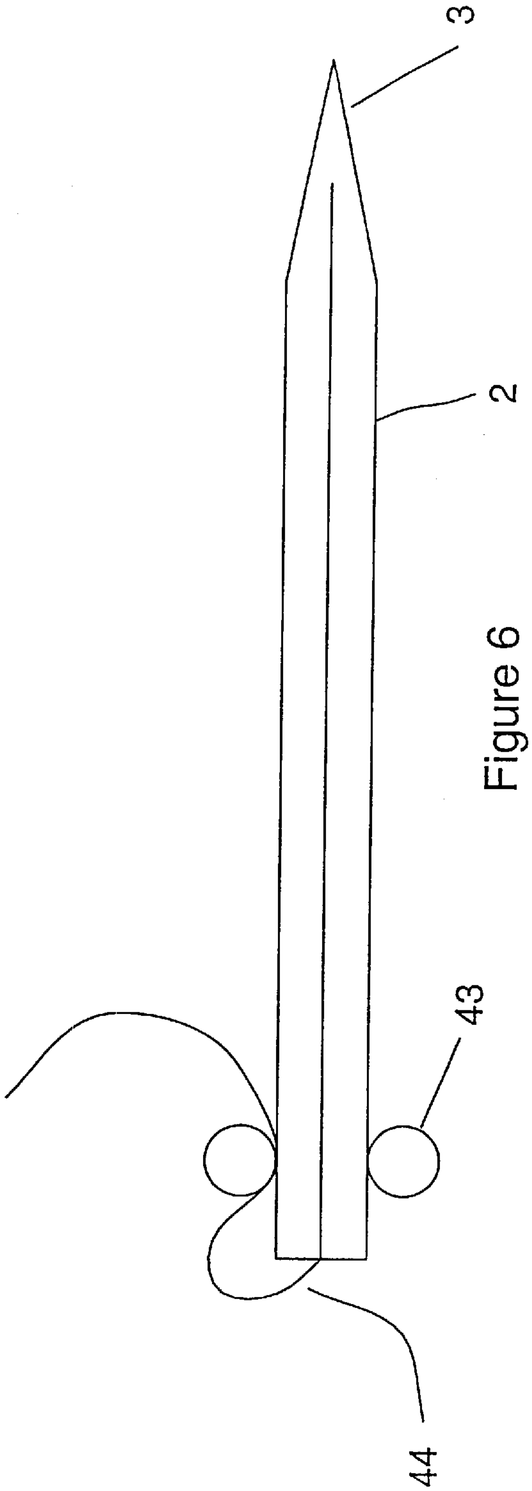
FIG. 6 shows a preferred embodiment of an uncoated glass microtip with an electrical contact wire inserted which is held in place by an external O-ring.

Metal coated tips have suffered from the conductive coating degrading during Electrospray operation leading to stopping of the Electrospray process or resulting in an unstable ion signal. When the ion signal stops during operation, it is difficult to determine while running if the cause is a failure of the conductive coating, a blocked microtip opening or the sample has run out. A conductive coating on a microtip often prevents viewing of the liquid level inside the microtip bore so the remaining sample level can not always be checked. To avoid problems encountered when using microtips with conductive coatings, an uncoated microtip has been developed which uses a conductive wire inserted into the microtip bore. FIG. 6 shows uncoated microtip 2 with a conductive wire 44 inserted into its bore. Conductive wire 44 is inserted as far into microtip 2 as possible extending into the drawn tip region 3 of microtip 2. O-ring 43 is installed around the microtip 2 tube outer diameter and serves to hold conductive wire 44 in place during operation. Referring to FIG. 3, O-ring 43 is positioned such that conductive wire 44, which is bent into an appropriate configuration, maintains an electrical contact with conductive nut 36 or removable tip holder body 29 during operation. When an internal conductive wire is used with an uncoated tip, electrical contact to the Electrospray tip is made through the sample bearing liquid. Conductive wire 44 can be installed in coated tips as well to increase longevity. Commonly, a metal coated tip will last for only one run and may not be used over again due to the wearing away of the coating. A single run may even be cut short due to this problem. The use of an internal wire contact eliminates unreliability due to the failure of a conductive coating and allows an uncoated microtip to be run for an extended period of time, on the order of days, with multiple sample fillings. When an internal conductive wire is used, the only reason to change a new microtip would be due to accidental breaking of the tip, tip plugging, or the need to avoid sample cross contamination when analyzing trace components. More robust and reliable Electrospray operation can be achieved with an internal wire contact when compared with coated tips.

Use of an internal conductive wire allows uncoated microtips to be used for low flow rate Electrospray. When uncoated tips are used, the meniscus of the trailing edge of the liquid sample loaded in microtip 2 is easily observable during operation through Electrospray chamber 4 viewport 5. With the meniscus visible, the amount of sample remaining can be noted at any time during a run.

If care is taken when pulling the microtip exit end down to a point, the tip exit end will remain open. A bubble test similar to that described above can be performed to verify the size of the microtip opening prior to installing a conducting wire and loading a sample into the microtip bore. Rapid and efficient sample loading and reliable Electrospray analysis can be achieved with uncoated microtips which have open exit ends and a conductive wire inserted. Observation of the sample liquid level in the microtip during operation helps in determining remaining run time for a given sample or in distinguishing between a plugged tip or the running out of sample if the Electrospray signal decreases. Electrospray microtip probe assembly 1 can be configured with Electrospray ion sources which use heated or unheated countercurrent drying gas or heated capillaries to facilitate charged droplet drying. Also ES source chambers can be preheated before Electrospraying at low flow rates, minimizing the need to add other sources of heat to dry Electrosprayed liquid droplets.

Other style tips may include tubes that extend continuously from the Electrospray tip through the collet and out though the probe body. With Electrospray tips configured as the exit end of tubes which extend to outside the Electrospray source, liquid sample can be continuously introduced through the tube inner bore during Electrospray operation. Removable Electrospray tips configured at the ends of tubes may be the exit end of capillary electrophoresis columns, capillary liquid chromatography columns, or glass, fused silica or metal liquid transfer lines. The tips of these tubes maybe blunt with no exit end taper or they maybe drawn or swaged into a tapering exit shape. These tips may have a electrically conductive coating on the exterior, they may have a wire inserted in the internal diameter from the exit end to make a electrical connection to the liquid, or the solution itself may be used as the electrical connection to the junction or pump that the tube is connected to. Continuous flow sample introduction tubes configured with microtips can be held in position with the holder and collet configuration described. Gas flow can be introduced along the tube outer diameter to microtip exit through the collet fingers to suppress corona discharge during Electrospray operation.

Having described this invention with regard to specific embodiments, it is to be understood that the description is not meant as a limitation since further modifications and variations may be apparent or may suggest themselves to those skilled in the art. It is intended that the present application cover all such modifications and variations as fall within the scope of the appended claims.

References Cited

The disclosures of the following references, which are referred to in the text above, are incorporated herein by reference:

1. U.S. Pat. No. 5,504,329, Inventors Mann, Matthias and Wilm, Matthias
2. M. Wilm and M. Mann, 42nd ASMS Conference Proceedings on Mass Spectrometry, 770, 1994.
3. M. Wilm and M. Mann, Analytical Chemistry, 68, 1–8, 1996.
4. A. Valaskovic, N. L. Kelleher, D. P. Little, D. J. Aaserud, and F. W. McLafferty, Analytical Chemistry, 67, 20, 3802–3805, 1995.
5. G. A. Valaskovic and F. W. McLafferty, J. AM. Soc. Mass Spectrom., 7, 1270–1272, 1996.

We claim:

1. An apparatus for producing ions from a sample substance comprising:

(a) an electrospray ion source, operated substantially at atmospheric pressure, a probe configured in said ion source, which produces ions from sample bearing solutions;

(b) a sample holding tube comprising an electrospray tip, an inner bore and an exit end from which said sample substance is Electrosprayed, (c) said a sample holding tube comprising an electrospray tip is removably mounted in a holder, a. said a sample holding tube comprising an electrospray tip is clamped in said holder with a collet assembly, and b. a means for delivering ions into a vacuum region.

2. An apparatus for producing ions from a sample substance comprising:

(a) an electrospray ion source, operated substantially at atmospheric pressure, a probe configured in said ion source, which produces ions from sample bearing solutions;

(b) a sample holding tube comprising an electrospray tip, an inner bore and an exit end from which said sample substance is Electrosprayed, (c) said a sample holding tube comprising an electrospray tip is removably mounted in a holder, (d) said a sample holding tube comprising an electrospray tip and said holder assembly are configured to be removably mounted in said electrospray ion source, (e) said holder assembly can be installed into and removed from said electrospray ion source without turning off voltages applied to elements in said electrospray ion source, a. a user is not exposed to said voltages applied to elements in said electrospray ion source during said installation and removal of said holder assembly, and b. a means for delivering ions into a vacuum region.

3. An apparatus according to claim 2, wherein said electrospray tip is a disposable glass tip.

4. An apparatus according to claim 2, wherein said electrospray tip is a disposable glass tip with metal coating on the exterior.

5. An apparatus according to claim 2, wherein said electrospray tip is a disposable glass tip with wire for electrical contact in the interior.

6. An apparatus according to claim 2, wherein said electrospray tip is fused silica tube.

7. An apparatus according to claim 2, wherein said electrospray tip is fused silica tube with metal coating on the exterior.

8. An apparatus according to claim 2, wherein said electrospray tip is fused silica tube with wire for electrical contact in the interior.

9. An apparatus according to claim 2, wherein said electrospray tip is fused silica CE column tube.

10. An apparatus according to claim 2, wherein said electrospray tip is stainless steel tube.

11. An apparatus according to claim 2, means for delivering ions into a vacuum region is a capillary.

12. An apparatus for analyzing chemical species comprising:

(a) an electrospray ion source, operated substantially at atmospheric pressure, a probe configured in said ion source, which produces ions from sample bearing solutions;

(b) a sample holding tube comprising an electrospray tip, an inner bore and an exit end from which said sample substance is Electrosprayed, (c) said a sample holding tube comprising an electrospray tip is removably mounted in a holder, a. said a sample holding tube comprising an electrospray tip is clamped in said holder with a collet assembly, and b. a means for mass analyzing said ions produced.

13. An apparatus according to claim 12, wherein said means for mass analyzing said ions produced comprises a Time-Of-Flight mass spectrometer.

14. An apparatus according to claim 12, wherein said means for mass analyzing said ions produced comprises a Quadrupole mass spectrometer.

15. An apparatus according to claim 12, wherein said means for mass analyzing said ions produced comprises an Ion Trap mass spectrometer.

16. An apparatus according to claim 12, wherein said means for mass analyzing said ions produced comprises a Fourier Transform mass spectrometer.

17. An apparatus according to claim 12, wherein said means for mass analyzing said ions produced comprises a magnetic sector mass spectrometer.

18. An apparatus according to claim 12, wherein said means for mass analyzing said ions produced comprises a hybrid mass spectrometer.

19. An apparatus for analyzing chemical species comprising:

(a) an electrospray ion source, operated substantially at atmospheric pressure, a probe configured in said ion source, which produces ions from sample bearing solutions;

(b) a sample holding tube comprising an electrospray tip, an inner bore and an exit end from which said sample substance is Electrosprayed, (c) said sample holding tube comprising said electrospray tip is removably mounted in a holder, (d) said a sample holding tube comprising an electrospray tip is clamped in said holder with a collet assembly, a. said holder is configured with a seal so that gas pressure can be applied to said inner bore of said electrospray tip, and b. a means for mass analyzing said ions produced.

20. An apparatus according to claim 19, wherein said means for mass analyzing said ions produced comprises a Time-Of-Flight mass spectrometer.

21. An apparatus according to claim 19, wherein said means for mass analyzing said ions produced comprises a Quadrupole mass spectrometer.

22. An apparatus according to claim 19, wherein said means for mass analyzing said ions produced comprises an Ion Trap mass spectrometer.

23. An apparatus according to claim 19, wherein said means for mass analyzing said ions produced comprises a Fourier Transform mass spectrometer.

24. An apparatus according to claim 19, wherein said means for mass analyzing said ions produced comprises a magnetic sector mass spectrometer.

25. An apparatus according to claim 19, wherein said means for mass analyzing said ions produced comprises a hybrid mass spectrometer.

26. An apparatus for analyzing chemical species comprising:

(a) an electrospray ion source, operated substantially at atmospheric pressure, a probe configured in said ion source, which produces ions from sample bearing solutions;

(b) a sample holding tube comprising an electrospray tip, an inner bore and an exit end from which said sample substance is Electrosprayed, (c) said sample holding tube comprising said electrospray tip is removably mounted in a holder, (d) said a sample holding tube comprising an electrospray tip is clamped in said holder with a collet assembly, a. said holder is comprised of a means to supply gas through said collet assembly to said exit end of said electrospray tip, and b. a means for mass analyzing said ions produced.

27. An apparatus according to claim 26, wherein said means for mass analyzing said ions produced comprises a Time-Of-Flight mass spectrometer.

28. An apparatus according to claim 26, wherein said means for mass analyzing said ions produced comprises a Quadrupole mass spectrometer.

29. An apparatus according to claim 26, wherein said means for mass analyzing said ions produced comprises an Ion Trap mass spectrometer.

30. An apparatus according to claim 26, wherein said means for mass analyzing said ions produced comprises a Fourier Transform mass spectrometer.

31. An apparatus according to claim 26, wherein said means for mass analyzing said ions produced comprises a magnetic sector mass spectrometer.

32. An apparatus according to claim 26, wherein said means for mass analyzing said ions produced comprises a hybrid mass spectrometer.

33. An apparatus for analyzing chemical species comprising:

(a) an electrospray ion source, operated substantially at atmospheric pressure, a probe configured in said ion source, which produces ions from sample bearing solutions;

(b) a sample holding tube comprising an electrospray tip, an inner bore and an exit end from which said sample substance is Electrosprayed, (c) said a sample holding tube comprising an electrospray tip is removably mounted in a holder, (d) said a sample holding tube comprising an electrospray tip and said holder assembly are configured to be removably mounted in said electrospray ion source, (e) said holder assembly can be installed into and removed from said electrospray ion source without turning off voltages applied to elements in said electrospray ion source, a. a user is not exposed to said voltages applied to elements in said electrospray ion source during said installation and removal of said holder assembly, and b. a means for mass analyzing said ions produced.

34. An apparatus according to claim 33, wherein said means for mass analyzing said ions produced comprises a Time-Of-Flight mass spectrometer.

35. An apparatus according to claim 33, wherein said means for mass analyzing said ions produced comprises a Quadrupole mass spectrometer.

36. An apparatus according to claim 33, wherein said means for mass analyzing said ions produced comprises an Ion Trap mass spectrometer.

37. An apparatus according to claim 33, wherein said means for mass analyzing said ions produced comprises a Fourier Transform mass spectrometer.

38. An apparatus according to claim 33, wherein said means for mass analyzing said ions produced comprises a magnetic sector mass spectrometer.

39. An apparatus according to claim 33, wherein said means for mass analyzing said ions produced comprises a hybrid mass spectrometer.

40. A method for opening tips that are not pre-opened:

a. pressuring closed tip with gas;

b. immersing closed tip in vial of solution;

c. pressing closed tip against vial bottom in a substantially perpendicular orientation until bubbles emanate from said tip.

41. A method according to claim 40, wherein said closed tip is glass closed tip.

42. A method according to claim 40, wherein said closed tip is metal coated.

43. A method according to claim 40, wherein said closed tip is un-coated.

44. A method for determining the quality of the tip prior to loading with sample:

a. pressuring open tip with gas;

b. immersing open tip in vial of solution;

c. according to bubble size determine a qualitative size of tip opening.

45. A method according to claim 44, wherein said means open tip is glass open tip.

46. A method according to claim 44, wherein said means open tip is metal coated.

47. A method according to claim 44, wherein said means open tip is un-coated.

48. A method according to claim 44, wherein said means open tip is un-coated with wire inside.

49. A method for wetting the tips prior to loading sample:

a. pressuring open tip with gas;

b. immersing open tip in vial of solution.

50. A method according to claim 49, wherein said means open tip is glass open tip.

51. A method according to claim 49, wherein said means open tip is metal coated.

52. A method according to claim 49, wherein said means open tip is un-coated.

53. A method according to claim 49, wherein said means open tip is un-coated with wire inside.

54. An apparatus according to claim 2, wherein said electrospray tip is movable in the X, Y, and Z directions.

55. An apparatus according to claim 2, wherein said electrospray tip is directly inserted into said mounting without disrupting the voltage supplied to said electrospray ion source.

56. An apparatus according to claim 2, comprising means to prevent a user from being electrically harmed when said electrospray tip is removed.

* * * * *